Figure 1:
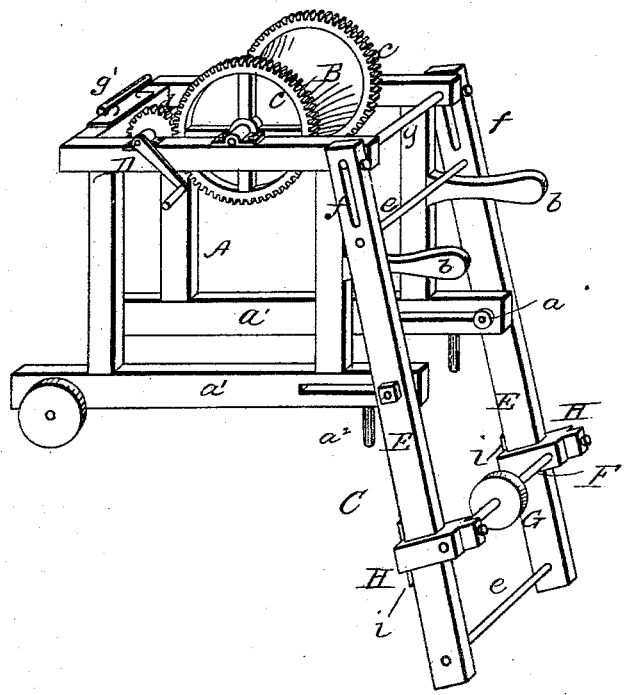

(No Model.) 2 Sheets—Sheet 1.

W. F. SMITH.
APPARATUS FOR LAYING ELECTRICAL CONDUCTORS.

No. 401,225. Patented Apr. 9, 1889.

WITNESSES
Albert B. Blackwood
L. Paul

Walter F. Smith
INVENTOR
by Connolly Bros
Atty's (No Model.) 2 Sheets—Sheet 2.
W. F. SMITH.
APPARATUS FOR LAYING ELECTRICAL CONDUCTORS.
No. 401,225. Patented Apr. 9, 1889.
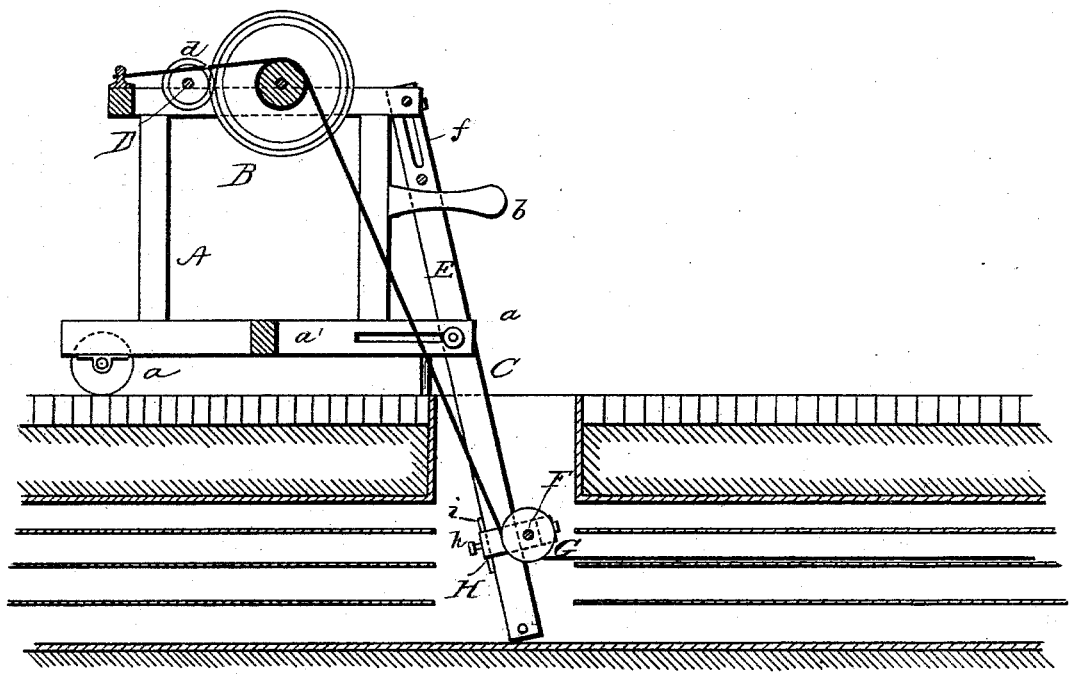
WITNESSES
Albert B. Blackwood
L. Paul
INVNTOR
Walter F Smith
by Connolly Bros
Atty's

UNITED STATES PATENT OFFICE.

WALTER F. SMITH, OF PHILADELPHIA, PENNSYLVANIA, ASSIGNOR TO THE UNITED ELECTRIC IMPROVEMENT COMPANY, OF GLOUCESTER CITY, NEW JERSEY.

APPARATUS FOR LAYING ELECTRICAL CONDUCTORS.

SPECIFICATION forming part of Letters Patent No. 401,225, dated April 9, 1889.

Application filed June 1, 1888. Serial No. 275,696. (No model.)

*To all whom it may concern:*

Be it known that I, WALTER F. SMITH, a citizen of the United States, residing at Philadelphia, in the county of Philadelphia and State of Pennsylvania, have invented certain new and useful Improvements in Apparatus for Laying Electrical Conductors; and I do hereby declare the following to be a full, clear, and exact description of the invention, reference being had to the accompanying drawings, which form part of this specification.

My invention has relation to apparatus or appliances for facilitating laying underground electrical conductors, and has for its object the provision of a specially-adapted winch or windlass, by means of which the lead-covered conductors may be readily drawn through the sections of the conduit between man-holes without injury to the conductors and at a great saving of the labor and expense hitherto incurred.

My invention consists in the novel construction and combination of parts hereinafter described, having reference particularly to the employment, in connection with an ordinary winch or windlass, of a supplementary adjustable pulley-frame and pulley adapted to be inserted in the man-hole of the conduit, so as to obtain a straight or horizontal draft on the conductors.

In the drawings, Figure 1 is a perspective view of the apparatus embodying my invention, and Fig. 2 is a vertical transverse section of the same.

A represents a windlass or winch stand, preferably supported on small wheels $a$ $a$ and provided with handles $b$ $b$, so that it can be conveniently moved from place to place.

B designates the windlass-drum, the shaft of which is provided with a gear or gear wheels, $c$, engaging with pinion $d$ on a crank-shaft D. When in use, the frame A rests on the ground close to or directly over a man-hole of the conduit.

C designates a supplementary frame consisting of the two parallel bars E E, connected by transverse bars or rounds $e$ $e$.

F is a transverse shaft carrying a pulley, G, and having its bearings in the projecting portions of the stirrups H H, which embrace the bars E E, and are adjustable thereon. When in position, the stirrups are rigidly secured by set-screws $h$ $h$, abutting against plates $i$ $i$, fastened to the bars E E. The pulley G is also adjustable on its shaft, so as to adapt itself to any position required and always be in alignment with the compartment through which the conductor is being drawn.

The frame C is attached to the frame A and arranged in such a position that the bars E E rest on the bottom of the man-hole.

In order to adapt the frame C to different conditions under which it is used, it is made adjustable in relation to the windlass-frame. For the purposes of such adjustment the bars E E are slotted at $ff$ to receive the ends of the transverse bar $g$ of the windlass-frame, while the base-bars $a'$ $a'$ of the windlass-frame are also slotted, and the side bars, E E, adjustably attached thereto by means of bolts $a^2 a^2$. By reason of this adjustment the frame C may be set to different depths and arranged at different angles or inclinations, according to the depth and dimensions of the man-hole. The pulley-shaft and pulley are adjustable, so as to adapt the pulley to the different heights of the galleries, shelves, or brackets in the conduit, so that the conductors may be arranged thereon while being drawn through the conduit-sections.

In using the apparatus the winch is located adjacent to one man-hole, while the conductor, wound upon a drum, is placed near the one from which the lines are to be led. A rope is now passed through the conduit-section from the man-hole near the winch, being pushed ahead by means of rods until it reaches the man-hole near the wound conductor. The rope is then attached to the end of the conductor and wound two or three times around the drum of the winch, its free end passing behind the latter and being held by the hand. The winch is now operated and the conductor drawn evenly through the conduit-section. A cleat, $g'$, is attached to the winch-frame back of the drum, so that the ropes may be fastened at any time while the operation of drawing is stopped.

Having described my invention, what I claim is—

1. The combination, with the portable winch or windlass frame A, having elongated longitudinally-slotted base-bars $a'$, of the supplementary detachable and adjustable frame E, carrying the pulley G, and secured to said base-bars by bolts $a^2$, substantially as described.

2. The combination, with the portable winch or windlass frame A, of the supplementary adjustable and detachable frame E E, the adjustable stirrups H, secured to the frame E E, the pulley G, and the pulley-shaft F, mounted in said stirrups, substantially as set forth.

3. The combination, with the horizontal winch or windlass frame having longitudinally-slotted base-bars and transverse tie-bar $g$, of the supplementary pulley-frame C and bolts $a^2$ $a^2$, substantially as set forth.

In testimony that I claim the foregoing I have hereunto set my hand this 26th day of May, A. D. 1888.

WALTER F. SMITH.

Witnesses:
JOS. B. CONNOLLY,
R. DALE SPARHAWK.